(12) United States Patent
Cho et al.

(10) Patent No.: US 10,828,867 B2
(45) Date of Patent: Nov. 10, 2020

(54) LIGHTWEIGHT COMPOSITE METAL SHEET HAVING EXCELLENT VIBRATION DAMPING CHARACTERISTICS, AND MANUFACTURING METHOD THEREFOR

(71) Applicant: POSCO, Pohang-si (KR)

(72) Inventors: Jaedong Cho, Incheon (KR); Chang Gyun Jung, Incheon (KR); Yong-Gyun Jung, Gwangyang-si (KR); Gyo-Sung Kim, Incheon (KR); Bonghoon Chung, Busan (KR); Yeong Gon Kim, Incheon (KR); Sang Eun Shim, Incheon (KR)

(73) Assignee: POSCO, Pohang-si (KR)

( * ) Notice: Subject to any disclaimer, the term of this patent is extended or adjusted under 35 U.S.C. 154(b) by 318 days.

(21) Appl. No.: 15/754,236

(22) PCT Filed: Sep. 2, 2016

(86) PCT No.: PCT/KR2016/009855
§ 371 (c)(1),
(2) Date: Feb. 21, 2018

(87) PCT Pub. No.: WO2017/039391
PCT Pub. Date: Mar. 9, 2017

(65) Prior Publication Data
US 2018/0281349 A1    Oct. 4, 2018

(30) Foreign Application Priority Data

Sep. 3, 2015  (KR) .......................... 10-2015-0124596

(51) Int. Cl.
| | | |
|---|---|---|
| *C08G 64/02* | (2006.01) | |
| *B32B 15/085* | (2006.01) | |
| *B32B 15/09* | (2006.01) | |
| *B32B 15/18* | (2006.01) | |
| *B32B 27/28* | (2006.01) | |
| *B32B 27/20* | (2006.01) | |
| *B32B 27/32* | (2006.01) | |
| *B32B 15/08* | (2006.01) | |
| *B32B 27/36* | (2006.01) | |
| *B32B 27/26* | (2006.01) | |
| *B32B 37/06* | (2006.01) | |
| *B32B 37/00* | (2006.01) | |

(52) U.S. Cl.
CPC ............ *B32B 15/085* (2013.01); *B32B 15/08* (2013.01); *B32B 15/09* (2013.01); *B32B 15/18* (2013.01); *B32B 27/20* (2013.01); *B32B 27/26* (2013.01); *B32B 27/285* (2013.01); *B32B 27/32* (2013.01); *B32B 27/36* (2013.01); *B32B 37/06* (2013.01); *B32B 2037/0092* (2013.01); *B32B 2250/02* (2013.01); *B32B 2250/03* (2013.01); *B32B 2250/40* (2013.01); *B32B 2270/00* (2013.01); *B32B 2274/00* (2013.01); *B32B 2307/102* (2013.01); *B32B 2307/542* (2013.01); *B32B 2307/56* (2013.01); *B32B 2307/718* (2013.01); *B32B 2307/72* (2013.01); *B32B 2309/02* (2013.01); *B32B 2309/12* (2013.01); *B32B 2605/00* (2013.01); *B32B 2605/08* (2013.01)

(58) Field of Classification Search
USPC ................ 528/176, 190, 193, 194, 271, 272
See application file for complete search history.

(56) References Cited

U.S. PATENT DOCUMENTS

2008/0023887 A1    1/2008  Vollenberg et al.

FOREIGN PATENT DOCUMENTS

| JP | H07-052315 A | 2/1995 |
|---|---|---|
| JP | 2001-172376 A | 6/2001 |
| JP | 2001-207044 A | 7/2001 |
| JP | 2004-269625 A | 9/2004 |
| JP | 2010-516511 A | 5/2010 |
| JP | 2013-60539 A | 4/2013 |
| KR | 10-1998-0009368 A | 4/1998 |
| KR | 10-2008-0105668 A | 12/2008 |
| KR | 10-2014-0016952 A | 2/2014 |
| KR | 10-2015-0055171 A | 5/2015 |

OTHER PUBLICATIONS

Office Action issued in corresponding Japanese Application No. 2018-510365, dated Feb. 26, 2019.
Extended European Search Report dated Jun. 12, 2018 issued in European Patent Application No. 16842357.2.
International Search Report dated Dec. 5, 2016 issued in International Patent Application No. PCT/KR2016/009855 (with English translation).

*Primary Examiner* — Terressa Boykin
(74) *Attorney, Agent, or Firm* — Morgan, Lewis & Bockius LLP

(57) ABSTRACT

The present invention relates to a lightweight composite metal sheet having excellent vibration damping characteristics and a method of manufacturing the same. Provided is a composite metal sheet including: a metal sheet; and a plastic layer disposed on one surface or both surfaces of the metal sheet and including a polyolefin and a thermoplastic polyester polyether elastomer.

9 Claims, 1 Drawing Sheet

【FIG1】
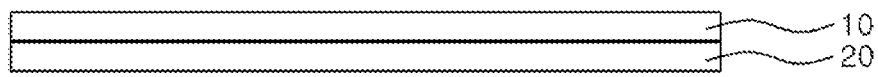
【FIG2】
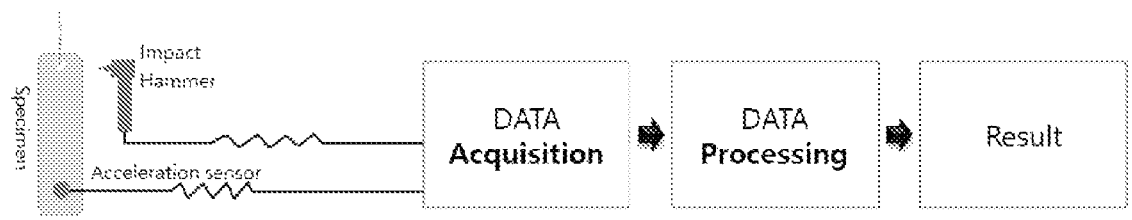
【FIG3】
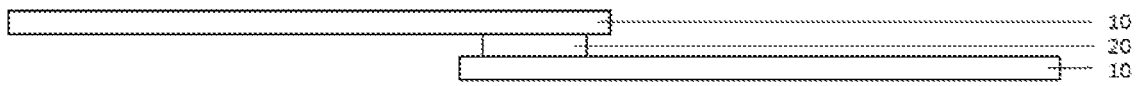
【FIG4】
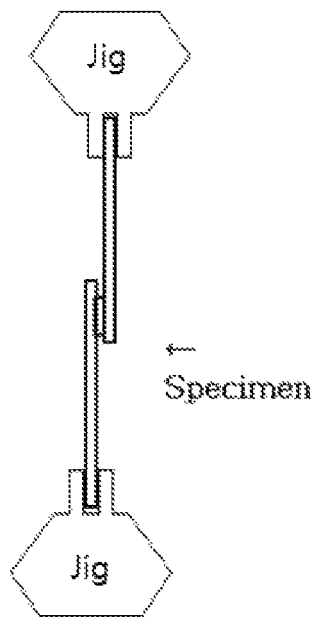

LIGHTWEIGHT COMPOSITE METAL SHEET HAVING EXCELLENT VIBRATION DAMPING CHARACTERISTICS, AND MANUFACTURING METHOD THEREFOR

CROSS REFERENCE

This patent application is the U.S. National Phase under 35 U.S.C. § 371 of International Application No. PCT/KR2016/009855, filed on Sep. 2, 2016, which claims the benefit of Korean Patent Application No. 10-2015-0124596, filed on Sep. 3, 2015, the entire contents of each are hereby incorporated by reference.

TECHNICAL FIELD

The present invention relates to a composite metal sheet and a method of manufacturing the same, and more particularly, to a lightweight composite metal sheet having excellent vibration damping characteristics and a method of manufacturing the same.

BACKGROUND ART

Conventional lightweight sandwich steel sheets for an automobile are fabricated by positioning a plastic core formed of polypropylene or polyamides between thin iron sheets having a thickness of 0.2 mm to 0.3 mm. Existing techniques use a thin iron sheet, and thus manufacturing costs increase and adhesion between a plastic core and a steel sheet is not sufficiently secured, and, accordingly, it is necessary to use a separate adhesive layer or develop a separate plastic.

DISCLOSURE

Technical Problem

An object of the present invention is to provide a lightweight composite metal sheet having high adhesion between a metal sheet and a plastic layer and excellent vibration damping characteristics, and a method of manufacturing the same.

Technical Solution

In order to achieve the object, the present invention provides a composite metal sheet including: a metal sheet; and a plastic layer disposed on one surface or both surfaces of the metal sheet and including a polyolefin and a thermoplastic polyester polyether elastomer.

In the present invention, the metal sheet may be a steel sheet.

In the present invention, the metal sheet may have a thickness of 0.2 mm to 1.2 mm.

In the present invention, the polyolefin may be polypropylene.

In the present invention, the thermoplastic polyester polyether elastomer may be prepared from a raw material composition including 20 wt % to 90 wt % of a polymer of dimethylene terephthalate and 1,4-butanediol and 10 wt % to 80 wt % of a polymer of dimethylene terephthalate and tetramethylene ether glycol.

In the present invention, the plastic layer may include 20 wt % to 80 wt % of the polyolefin and 20 wt % to 80 wt % of the thermoplastic polyester polyether elastomer.

In the present invention, the plastic layer may have a thickness of 0.3 mm to 1.0 mm.

In the present invention, the metal sheet and the plastic layer may be bonded to each other by thermal compression without a separate adhesive layer.

The composite metal sheet according to the present invention may have a vibration at a primary natural frequency of 40 dB to 85 dB and a vibration at a secondary natural frequency of 40 dB to 64 dB.

The composite metal sheet according to the present invention may have a shear strength of 1000 N to 3000 N.

The present invention also provides a method of manufacturing a composite metal sheet, including: preparing a metal sheet; forming a plastic layer including a polyolefin and a thermoplastic polyester polyether elastomer; and bonding the metal sheet and the plastic layer by thermal compression.

The thermal compression may be performed at a temperature ranging from 170☐ to 240☐ and a pressure ranging from 60 kgf/cm² to 150 kgf/cm².

Advantageous Effects

A composite metal sheet according to the present invention uses a thermoplastic polyester polyether elastomer in a plastic layer, and thus has high adhesion between a metal sheet and the plastic layer and, in particular, excellent vibration damping characteristics.

DESCRIPTION OF DRAWINGS

FIG. 1 is a cross-sectional view of a composite metal sheet according to an embodiment of the present invention.

FIG. 2 illustrates a vibration damping test method for the composite metal sheet according to an embodiment of the present invention.

FIG. 3 is a cross-sectional view of a composite metal sheet according to another embodiment of the present invention.

FIG. 4 illustrates an adhesion test method for the composite metal sheet according to another embodiment of the present invention.

BEST MODE

Hereinafter, the present invention will be described in detail.

FIG. 1 is a cross-sectional view of a composite metal sheet according to an embodiment of the present invention. The composite metal sheet according to the present embodiment may include a metal sheet 10 and a plastic layer 20. A stacked structure of the composite metal sheet according to the present invention is not limited to FIG. 1, and may be variously changed when necessary. For example, as illustrated in FIG. 3, the stacked structure may be a sandwich structure in which the metal sheets 10 are stacked on upper and lower portions of the plastic layer 20, with the plastic layer 20 present therebetween. In addition, other layers in addition to the metal sheet 10 and the plastic layer 20 may be stacked.

The metal sheet 10 may be a steel sheet. As the steel sheet, a hot-dipped galvanized iron (GI) sheet, an electrolytic GI sheet, a hot-dipped aluminized steel sheet, a hot-dipped aluminum-zinc alloy coated steel sheet, a hot-dipped galvannealed steel sheet, or the like may be used.

The metal sheet 10 may have a thickness of 0.2 mm to 1.2 mm, preferably, 0.3 mm to 1 mm, and, more preferably, 0.4 mm to 0.8 mm. When the thickness of the metal sheet 10 is too small, it is difficult to secure sufficient rigidity, and manufacturing costs may significantly increase. On the other hand, when the thickness of the metal sheet 10 is too large, a lightweight effect may decrease, and it may be difficult to perform processing thereon.

The plastic layer 20 may include a polyolefin and a thermoplastic polyester polyether elastomer (TPEE).

In the present invention, to secure economic efficiency, a polyolefin is used as a main raw material of the plastic layer 20, and mixed with a TPEE, and thus a disadvantage in terms of adhesion of the polyolefin may be addressed and excellent vibration damping characteristics may be secured.

As the polyolefin, polyethylene (PE), polypropylene (PP), polybutylene, or the like may be used, but, preferably, PP may be used to secure thermal resistance and economic efficiency.

The thermoplastic polyester polyether elastomer (TPEE) may be prepared by polymerizing a raw material composition including polyester, which is a hard segment, as a first monomer and polyether, which is a soft segment, as a second monomer.

As the first monomer (polyester), polybutylene terephthalate, polyethylene terephthalate, polytrimethylene terephthalate, polyethylene naphthalate, or the like may be used. Among these, polybutylene terephthalate is preferably used due to its high crystallinity. The polybutylene terephthalate may be a polymer of dimethylene terephthalate and 1,4-butanediol.

A content of the polyester may range from 20 wt % to 90 wt %, preferably, 20 wt % to 60 wt %, and, more preferably, 20 wt % to 40 wt %, with respect to a total weight of the raw material composition. When the content of the polyester is too small, rigidity, elasticity, and thermal resistance of an obtained thermoplastic polyester polyether elastomer may deteriorate. On the other hand, when the content of the polyester is too large, the thermoplastic polyester polyether elastomer has no flexibility due to its increased crystallinity, and has increased viscosity, resulting in difficulty in molding thereof to be manufactured as a product.

As the second monomer (polyether), polytetramethylene ether glycol, polyalkylene glycol, polyethylene glycol, polypropylene glycol, or the like may be used. Among these, polytetramethylene ether glycol is preferably used due to its high flexibility since it is a soft segment. The polytetramethylene ether glycol may be a polymer of dimethylene terephthalate and tetramethylene ether glycol.

A content of the polyether may range from 10 wt % to 80 wt %, preferably, 40 wt % to 80 wt %, and, more preferably, 60 wt % to 80 wt %, with respect to a total weight of the raw material composition. When the content of the polyether is too small, the thermoplastic polyester polyether elastomer may have deteriorated flexibility. On the other hand, when the content of the polyether is too large, strength and thermal resistance thereof may deteriorate.

The raw material composition of the thermoplastic polyester polyether elastomer may include a general polymerization initiator and a general additive, in addition to the first monomer and the second monomer described above.

A molecular weight of the thermoplastic polyester polyether elastomer may be a weight average molecular weight (Mw) measured using gel permeation chromatography (GPC) or the like and range from 300 to 10,000. When the molecular weight of the thermoplastic polyester polyether elastomer is too small, mechanical and physical properties, thermal resistance, and viscosity of the plastic layer 20 may be too low, and adhesion of the plastic layer 20 to the metal sheet 10 may be reduced. On the other hand, when the molecular weight of the thermoplastic polyester polyether elastomer is too large, the plastic layer 20 may have excessive viscosity and increased elasticity, and thus, when the plastic layer 20 is used to fabricate a composite metal sheet, formability of the composite metal sheet may deteriorate.

The plastic layer 20 may include 20 wt % to 80 wt % of the polyolefin and 20 wt % to 80 wt % of the thermoplastic polyester polyether elastomer with respect to the total weight of the plastic layer 20. When the content of the polyolefin is too small or the content of the thermoplastic polyester polyether elastomer is too large, it may be impossible to guarantee mechanical strength, thermal resistance, and weather resistance of the plastic layer 20, and economic efficiency may be reduced. On the other hand, when the content of the polyolefin is too large or the content of the thermoplastic polyester polyether elastomer is too small, it may be impossible to secure adhesion between the plastic layer 20 and the metal sheet 10, and flexibility and bending fatigue resistance may be reduced.

The plastic layer 20 may include an additive (a curing agent, an antioxidant, a filler, or the like) in addition to the polyolefin and the thermoplastic polyester polyether elastomer described above.

The plastic layer 20 may be formed into a plate or sheet shape through extrusion, calendaring, casting, or the like.

The plastic layer 20 may have a thickness of 0.3 mm to 1.0 mm, preferably 0.3 mm to 0.8 mm, and, more preferably, 0.4 mm to 0.6 mm. When the thickness of the plastic layer 20 is too small, the thickness is not sufficient to attenuate an external impact or load, and thus an overall vibration damping effect of a composite metal sheet may be reduced. On the other hand, when the thickness of the plastic layer 20 is too large, it may be difficult to mold a composite metal sheet into a product due to elasticity of the plastic layer 20.

The metal sheet 10 and the plastic layer 20 may be bonded to each other by thermal compression without a separate adhesive layer. That is, the composite metal sheet according to the present invention may be manufactured by thermal compression, and does not require a separate adhesive layer.

As a result of performing a vibration damping test on the composite metal sheet according to the present invention, a vibration at a primary natural frequency may be 85 dB or less. A lower limit of the vibration is not particularly limited, and may be, for example, 40 dB. In particular, the vibration at a primary natural frequency may range from 40 dB to 85 dB, preferably, 40 dB to 80 dB, and, more preferably, 40 dB to 75 dB. A vibration at a secondary natural frequency may be 64 dB or less. A lower limit of the vibration is not particularly limited, and may be, for example, 40 dB. In particular, the vibration at a secondary natural frequency may range from 40 dB to 64 dB, preferably, 40 dB to 62 dB.

A shear strength related to adhesion of the composite metal sheet according to the present invention may vary according to composition of the plastic layer 20, and the shear strength may increase as the content of the elastomer increases. For example, the shear strength of the composite metal sheet may range from 1000 N to 3000 N, preferably, 1200 N to 2500 N.

The present invention also provides a method of manufacturing a composite metal sheet, including: preparing a metal sheet; forming a plastic layer including a polyolefin and a thermoplastic polyester polyether elastomer; and bonding the metal sheet and the plastic layer by thermal compression.

The thermal compression may be performed using a hot press device at a temperature ranging from 170° to 240°, preferably 190° to 240°, and, more preferably, 210° to 230° and a pressure ranging from 60 kgf/cm² to 150 kgf/cm², preferably, 80 kgf/cm² to 130 kgf/cm², and, more preferably, 90 kgf/cm² to 110 kgf/cm². When the temperature of the thermal compression is too low, it is impossible to form the plastic layer 20 into a molten state having sufficient flowability, and the plastic layer 20 does not spread over a whole surface of the metal sheet 10. On the other hand, when the temperature of the thermal compression is too high, the plastic layer 20 may be easily burned, and thus may lose intrinsic physical properties. When the pressure of the thermal compression is too low, the metal sheet 10 and the plastic layer 20 cannot be sufficiently adhered. On the other hand, when the pressure of the thermal compression is too high, it may be difficult to maintain a uniform thickness of the plastic layer 20.

A lightweight composite steel sheet according to the present invention has very high adhesion between a metal sheet and a plastic layer by appropriately balancing plastic properties of polypropylene that constitute the plastic layer and rubber properties of the thermoplastic polyester polyether elastomer that constitute the plastic layer, and, in particular, has excellent vibration damping characteristics.

The composite metal sheet according to the present invention has a density of 1.46 to 7.0, and may be applied to automobile finishing (closure) materials, automobile exterior plate materials, and the like which require weight reduction. In particular, the composite metal sheet is applied to automobile door modules, and the like, and thus the weight reduction of an automobile is enabled. In addition, when the composite metal sheet according to the present invention is applied to an automobile door module or the like, there is no need to use an anti-vibration pad further used for removing vibration and noise.

Example 1

A hot-dipped galvanized iron (GI) sheet having a thickness of 0.6 mm was used as a metal sheet. A plastic layer was formed by melt-mixing 80 wt % of polypropylene (PP) and 20 wt % of a thermoplastic polyester polyether elastomer (TPEE) and then extruding the resulting mixture to a thickness of 0.5 mm. At this time, the thermoplastic polyester polyether elastomer was prepared from a raw material composition including 30 wt % of polybutylene terephthalate and 70 wt % of polytetramethylene ether glycol. The prepared hot-dipped GI sheet and the formed plastic layer were thermally compressed using a hot press device at a temperature of 220° and a pressure of 100 kgf/cm², thereby integrating the GI sheet and the plastic layer.

Comparative Example 1

A composite metal sheet was manufactured in the same manner as in Example 1, except that a hot-dipped GI sheet having a thickness of 0.8 mm was used as a metal sheet, and a plastic layer was formed using only polypropylene (PP) without using the thermoplastic polyester polyether elastomer (TPEE).

Comparative Example 2

A composite metal sheet was manufactured in the same manner as in Example 1, except that a plastic layer was formed using polyvinyl butyral (PVB) instead of the thermoplastic polyester polyether elastomer (TPEE).

Experimental Example 1

1. Vibration Damping Test

A vibration damping test was performed on two-layered laminate steel sheets manufactured according to Example 1 and Comparative Examples 1 and 2. As illustrated in FIG. 2, the test was performed on a specimen having a size of 95 mm×30 mm with a hole having a diameter of 3 mm using an impact hammer (PCB Piezotronics, Model No. 086E80) and an acceleration sensor (B&K type 4373). An excitation force of 50 N was applied thereto. In Table 1 below, Mode $1^{st}$ denotes measurement of a vibration at a primary natural frequency, and Mode $2^{nd}$ was performed under a secondary natural frequency condition.

TABLE 1

| | Material | Thickness of steel | | Vibration damping test results | |
|---|---|---|---|---|---|
| | of steel sheet | sheet (mmt) | Composition of plastic layer | Mode 1st | Mode 2nd |
| Comparative Example 1 | GI | 0.8 | PP 100 wt % | 88 dB | 79 dB |
| Comparative Example 2 | GI | 0.6 | PP 80 wt % + PVB 20 wt % | 86 dB | 65 dB |
| Example 1 | GI | 0.6 | PP 80 wt % + TPEE 20 wt % | 74 dB | 61 dB |

According to Table 1, it was quantitatively confirmed that the laminate steel sheet according to the present invention had excellent vibration improvement characteristics. In particular, it was confirmed that the TPEE material of Example 1 had a much higher vibration reduction effect than that of the PVB material of Comparative Example 2.

Examples 2 to 7

Two hot-dipped galvanized iron (GI) sheets having a thickness of 0.3 mm were used as metal sheets. Plastic layers were formed by melt-mixing polypropylene (PP) and a thermoplastic polyester polyether elastomer (TPEE) in contents varying as shown in Table 2 and then extruding the resulting mixture to a thickness of 0.5 mm. At this time, the thermoplastic polyester polyether elastomer was prepared from a raw material composition including 30 wt % of polybutylene terephthalate and 70 wt % of polytetramethylene ether glycol. The prepared two hot-dipped GI sheets and the formed plastic layer were thermally compressed using a hot press device at a temperature of 220° and a pressure of 100 kgf/cm² to manufacture a sandwich structure in which the metal sheets 10 were stacked on upper and lower portions of the plastic layer 20, with the plastic layer 20 present therebetween.

Comparative Example 3

A composite metal sheet was manufactured in the same manner as in Example 2, except that a plastic layer was formed using only polypropylene (PP) without using the thermoplastic polyester polyether elastomer (TPEE).

Comparative Example 4

A composite metal sheet was manufactured in the same manner as in Example 2, except that a plastic layer was formed using only polyethylene terephthalate (PET) instead of polypropylene (PP) and the thermoplastic polyester polyether elastomer (TPEE).

Comparative Example 5

A composite metal sheet was manufactured in the same manner as in Example 2, except that a plastic layer was formed using only Nylon6,6 instead of polypropylene (PP) and the thermoplastic polyester polyether elastomer (TPEE).

Comparative Examples 6 to 12

Composite metal sheets were manufactured in the same manner as in Example 2, except that plastic layers are formed using polyvinylbutyral (PVB) at varying contents thereof as shown in Table 2 instead of the thermoplastic polyester polyether elastomer (TPEE).

Experimental Example 2

2. Adhesion Test

An adhesion test was performed on three-layered sandwich structures manufactured according to Examples 2 to 7 and Comparative Examples 3 to 12. As illustrated in FIG. 4, the test was performed on a specimen having a size of 25 mm (width)×255 mm (length)×1.1 mm (thickness) using a Lap shear test. In particular, shear strengths were measured under conditions: a tensile speed of 50 mm/min and a 50 kN load cell.

TABLE 2

|  | Material of steel sheet | Thickness of steel sheet (mmt) | Composition of plastic layer | Shear strength (maximum load)(N) |
|---|---|---|---|---|
| Comparative Example 3 | GI | 0.3 | PP 100 wt % | Failure |
| Comparative Example 4 | GI | 0.3 | PET 100 wt % | Failure |
| Comparative Example 5 | GI | 0.3 | Nylon6,6 100 wt % | Failure |
| Comparative Example 6 | GI | 0.3 | PP 80 wt % + PVB 20 wt % | 683 |
| Comparative Example 7 | GI | 0.3 | PP 70 wt % + PVB 30 wt % | 844 |
| Comparative Example 8 | GI | 0.3 | PP 60 wt % + PVB 40 wt % | 1076 |
| Comparative Example 9 | GI | 0.3 | PP 50 wt % + PVB 50 wt % | 1854 |
| Comparative Example 10 | GI | 0.3 | PP 40 wt % + PVB 60 wt % | 2070 |
| Comparative Example 11 | GI | 0.3 | PP 30 wt % + PVB 70 wt % | 1912 |
| Comparative Example 12 | GI | 0.3 | PP 20 wt % + PVB 80 wt % | 2384 |
| Example 2 | GI | 0.3 | PP 70 wt % + TPEE 30 wt % | 1247 |
| Example 3 | GI | 0.3 | PP 60 wt % + TPEE 40 wt % | 1394 |
| Example 4 | GI | 0.3 | PP 50 wt % + TPEE 50 wt % | 1259 |
| Example 5 | GI | 0.3 | PP 40 wt % + TPEE 60 wt % | 1791 |
| Example 6 | GI | 0.3 | PP 30 wt % + TPEE 70 wt % | 2198 |
| Example 7 | GI | 0.3 | PP 20 wt % + TPEE 80 wt % | 2449 |

According to Table 2, it was seen that the sandwich-structured composite metal sheets according to the present invention had high adhesion. In particular, it was confirmed that the cases of Examples 2 to 7 exhibited higher adhesion between the plastic layer 20 formed of the TPEE material and a metal sheet than that between the plastic layer 20 formed of the PVB material and a metal sheet of the cases of Comparative Examples 6 to 12.

The invention claimed is:

1. A composite metal sheet comprising:
    a metal sheet; and
    a plastic layer disposed on one surface or both surfaces of the metal sheet and comprising a polyolefin and a thermoplastic polyester polyether elastomer,
    wherein the metal sheet is a steel sheet,
    wherein the thermoplastic polyester polyether elastomer is prepared from a raw material composition comprising 20 wt % to 90 wt % of a polymer of dimethylene terephthalate and 1,4-butanediol and 10 wt % to 80 wt % of a polymer of dimethylene terephthalate and tetramethylene ether glycol, and
    wherein the plastic layer comprises 20 wt % to 80 wt % of the polyolefin sod 20 wt % to 80 wt % of the thermoplastic polyester polyether elastomer.

2. The composite metal sheet of claim 1, wherein the metal sheet has a thickness of 0.2 mm to 1.2 mm.

3. The composite metal sheet of claim 1, wherein the polyolefin is polypropylene.

4. The composite metal sheet of claim 1, wherein the plastic layer has a thickness of 0.3 mm to 1.0 mm.

5. The composite metal sheet of claim 1, wherein the metal sheet and the plastic layer are bonded to each other by thermal compression without a separate adhesive layer.

6. The composite metal sheet of claim 1, wherein the composite metal sheet has a vibration at a primary natural frequency of 40 dB to 85 dB and a vibration at a secondary natural frequency of 40 dB to 64 dB.

7. The composite metal sheet of claim 1, wherein the composite metal sheet has a shear strength of 1000 N to 3000 N.

8. The method of manufacturing a composite metal sheet of claim 1, the method comprising:
    preparing a metal sheet;
    forming a plastic layer comprising a polyolefin and a thermoplastic polyester polyether elastomer; and
    bonding the metal sheet and the plastic layer by thermal compression.

9. The method of claim 8, wherein the thermal compression is performed at a temperature ranging from 170° C. to 240° C. and a pressure ranging from 60 kgf/cm$^2$ to 150 kgf/cm$^2$.

* * * * *